United States Patent [19]
Pile et al.

[11] 3,915,214
[45] Oct. 28, 1975

[54] TIRE BEAD RETAINER
[75] Inventors: William D. Pile, Okemos, Mich.; Gerhart L. Gerbeth, Akron, Ohio
[73] Assignee: The Goodyear Tire & Rubber Company, Akron, Ohio
[22] Filed: Nov. 5, 1973
[21] Appl. No.: 413,017

[52] U.S. Cl............. 152/379; 152/362 R; 152/406; 24/81 AG
[51] Int. Cl.²......................................... B60C 15/02
[58] Field of Search.......... 152/233, 242, 362, 379, 152/381, 383, 384, 398, 386, 399, 400, 406; 301/5 R; 24/81 AG, 265 CD; 248/361 A

[56] References Cited
UNITED STATES PATENTS

| | | | |
|---|---|---|---|
| 2,059,825 | 11/1936 | Talbott | 248/361 A |
| 2,067,448 | 1/1937 | Horn | 152/381 |
| 2,663,061 | 12/1953 | Zarth | 24/86 R |
| 2,908,522 | 10/1959 | Glave | 248/361 A |
| 3,290,743 | 12/1966 | Hanson | 248/361 A |

*Primary Examiner*—Drayton E. Hoffman
*Attorney, Agent, or Firm*—F. W. Brunner; H. E. Hummer

[57] ABSTRACT

A bead clip or retainer which is used with a number of similar retainers for maintaining the beads of a pneumatic tire seated on a two-piece wheel rim, when the tire suddenly loses air and is in a run-flat condition where the beads become unseated and the tire can leave the rim.

8 Claims, 2 Drawing Figures

TIRE BEAD RETAINER

BACKGROUND OF THE INVENTION

The invention is particularly well suited for use in connection with two-piece rims having split side rings, although it is effectively employed in conjunction with single piece, drop center rims, or multiple piece rims having continuous, one-piece side flanges.

A pneumatic tire, rotating at high speed, rapidly changes position on the wheel rim when, for some reason, the tire suddenly loses air and deflates. The automobile, or other vehicle on which the tire is mounted, tends to swerve when this happens, and unless extreme care is exercised, the driver may lose command of the car, resulting in an accident. The car would be more controllable, if the beads of the tire remained firmly seated on the rim during this run-flat condition of the tire.

Bead clips have been developed to accomplish this. Typical of the bead clips used today are those shown in U.S. Pat. No. 2,663,061 and described as being generally rigid and made of spring steel. These clips are each provided with a pair of opposing ends which are specially configured for engaging the rolled edges of the side flanges of the rim and toe of an adjacent tire bead. A rigid strap portion connects the two ends and is shaped to seat against the adjacent portions of the rim and side flange. A number of clips are spaced around each side flange of the rim for holding the beads of the tire firmly in position on the bead seats formed in the rim adjacent the side flanges.

The action or flexing of the tire as it moves through the footprint, or over the roadway, causes corresponding flexing in the connecting strap of the bead clips. Unfortunately, these steel clips become very brittle after considerable use and exposure to the elements, thus making the rigid strap portions highly susceptible to breaking under the stresses created in the strap portions during this flexing action. Once broken, a clip is ineffective in helping hold the beads of the tire seated on the rim. The invention is directed to providing a highly improved bead clip having greater resistance to flexure stresses than the more rigid clips.

Briefly stated, the invention is in a bead clip or retainer comprising two rigid end portions for interlockingly engaging a side flange of the rim and the inner toe of an adjacent bead of a tire mounted on the rim. An inextensible strap connecting the rigid end portions is flexible and not rigid and, therefore, able to more effectively resist the flexure stresses.

DESCRIPTION OF THE DRAWING

The following description of the invention will be better understood by having reference to the annexed drawing, wherein.

ENVIRONMENT OF THE INVENTION

Figure 1:
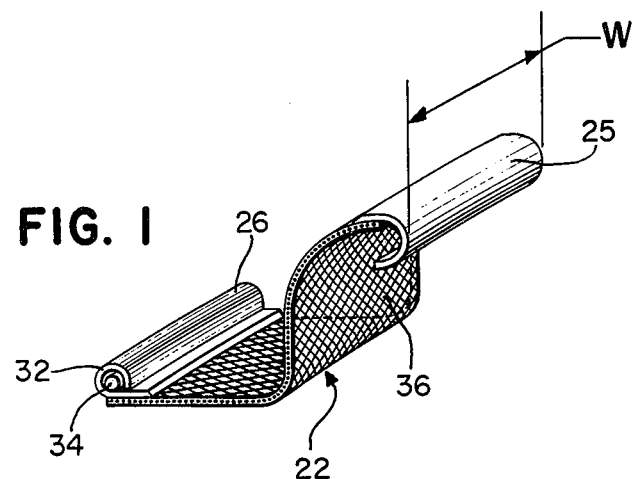
FIG. 1 is a perspective view of a bead clip or retainer made in accordance with the invention.
Figure 2:
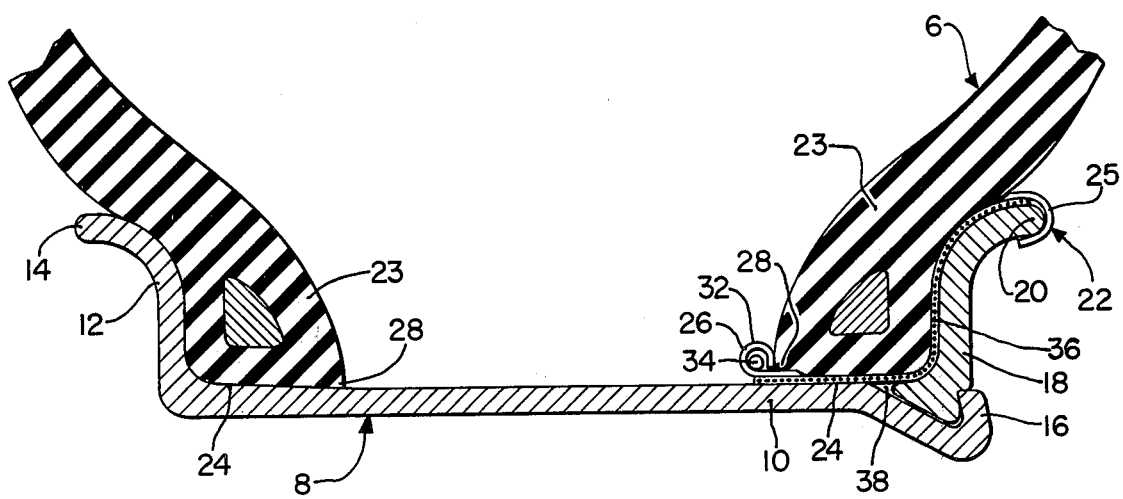
FIG. 2 is a partial cross-sectional view of a tire, wheel rim, and bead retainer.

Referring generally to the drawing, and more particularly to FIG. 2, there is shown a pneumatic tire 6 mounted on a conventional two-piece wheel rim 8 which comprises a cylindrical base 10 with an integrally formed upstanding annular side flange 12 having a rolled edge or lip 14. The rim base 10 is provided with a specially configured end, or gutter, 16 for interlocking engagement with a removable, split side ring 18 which faces outwardly and is exposed when the assembled tire 6 and rim 8 are mounted on a truck or automobile axle. The split ring 18 acts as the outer side flange of the rim 8 and has a rolled edge or lip 20 similar to the rolled edge 14 of the inner side flange 12.

THE INVENTION

A bead clip or retainer, generally indicated at 22, is used with a number of similar bead retainers for maintaining the tire beads 23 of the pneumatic tire 6 firmly in place on the bead seats 24 provided in the wheel rim 8 adjacent the side flanges 12 and 18. The number of clips 22 spaced around each of the side flanges 12 and 18 depends on the size of the tire. For example, six bead clips 22 are used for holding each bead of a small truck tire on the wheel rim 8. It is not necessary that the bead clips 22 on opposing sides of the rim 8, be in arcuate alignment. Thus, a single bead clip 22 is shown in FIG. 2.

Each of the bead clips 22 comprises a rigid end or fastener 25, which is preferably configured to matingly engage and partially wrap around the adjacent rolled lips or edges 14 and 20 of the rim flanges 12 and 18. A configured stop or abutment 26 is provided at the opposing end of each of the bead clips 22 for engaging the toe 28 of an adjacent tire bead 23. The stop 26 can be of any suitable design, e.g. a flange 32 rolled around a reinforcing rod 34. The stops 26 engage the tire beads 23 and prevent them from leaving the bead seats 24 on the rim 8 when the tire 6 suddenly loses air and becomes deflated.

An inextensible, but flexible, strap 36 is provided for connecting the rigid fastener 25 and stop 26 of each bead clip 22. The flexible strap 36 is designed or shaped to rest against the adjacent bead seats 24 and rim flanges 12 and 18. The flexible strap 36 is preferably composed of flexible wire mesh, but can be composed of any suitable non-metallic material, e.g. woven filamentary material, or elastomeric material such as plastic. The bead retainers 22 can be manufactured in any suitable width W, e.g. 1–2 inches, depending on the size of the tire and rim. It can be appreciated that the tire beads 23 would be easily unseated, if the material of the connecting strap 36 was extensible in the sense that it was stretchable like a rubber band. Thus, the material of the connecting strap 36 must be sufficiently inextensible to maintain the tire beads 23 adjacent the rim flanges 12 and 18 when the tire suddenly becomes deflated while rotating at high speeds. The connecting strap 36 must also be flexible in that it has a high resistance to fatigue caused by repeated flexing or bending. These two properties are important in providing a good workable strap 36 which will not readily break under repeated flexing as the tire 6 moves through the footprint, or upon contacting the ground or roadway.

It was found that the spring steel clips, previously referred to, broke most frequently in the area adjacent the juncture 38 between the split side ring 18 and rim base 10. The flexible strap 36, however, proved more effective in resisting the concentration of stress in this area to keep the bead clips 22 from breaking and becoming ineffective for maintaining the tire beads 23 in place on the wheel rim 8.

Thus, there has been described a highly improved bead clip for retaining the beads of the tire on the bead seats adjacent the side flanges of the rim when, for some reason, the tire suddenly loses air and becomes deflated.

While certain representative embodiments and details have been shown for the purpose of illustrating the invention, it will be apparent to those skilled in the art that various changes and modifications may be made therein without departing from the spirit or scope of the invention.

What is claimed is:

1. In combination:
   a. a wheel rim, including a rim base, a pair of annular flanges extending from opposing sides of the rim base, and an annular bead seat adjacent each side flange;
   b. a tire mounted on the wheel rim such that the beads of the tire are seated on the bead seats adjacent the side flanges; and
   c. a plurality of clips spaced around the side flanges for retaining the beads of the tire on the bead seats, each of the clips comprising;
      I. a rigid fastener interlockingly engaging an adjacent side flange;
      II. a rigid stop interlockingly engaging an adjacent toe of the tire bead; and
      III. an inextensible strap connecting the fastener and stop, the strap being between the bead of the tire and adjacent bead seat and side flange of the wheel rim, at least the portion of the strap adjacent the bead seat being substantially more flexible than a like strap portion which is solid and composed of the material of the rigid fastener and stop, the strap portion being highly resistant to fatigue caused by repeated flexing thereof as the tire flexes.

2. The combination of claim 1, wherein one of the side flanges of the wheel rim is a split ring which is removably mounted on the rim base.

3. The combination of claim 1, wherein the portion of the strap adjacent the side flange is composed of the same material and has the same structure as the portion of the strap adjacent the bead seat.

4. The combination of claim 1, wherein the fasteners are configured to at least partially wrap around rolled lips of the side flanges.

5. The combination of claim 4 wherein the stops are configured to at least partially wrap around the toes of the tire beads.

6. The combination of claim 1, wherein the strap portion is wire mesh.

7. The combination of claim 1, wherein the strap portion is non-metallic.

8. The combination of claim 7, wherein the strap portion is plastic.

* * * * *